(12) United States Patent
Liao

(10) Patent No.: US 7,090,231 B1
(45) Date of Patent: Aug. 15, 2006

(54) ADJUSTABLE FRONT FORK BLADE FOR STROLLER

(75) Inventor: Gordon Liao, Yung Kang (TW)

(73) Assignee: Unique Product & Design Co., Ltd., Yung Kang (TW)

( * ) Notice: Subject to any disclaimer, the term of this patent is extended or adjusted under 35 U.S.C. 154(b) by 0 days.

(21) Appl. No.: 11/141,077

(22) Filed: May 31, 2005

(51) Int. Cl.
*B62B 7/06* (2006.01)

(52) U.S. Cl. ............ 280/47.38; 280/276; 403/83; 403/103

(58) Field of Classification Search ............ 403/103, 403/83, 84; 280/276, 279, 284, 288, 47.38
See application file for complete search history.

(56) References Cited

U.S. PATENT DOCUMENTS

| | | | | |
|---|---|---|---|---|
| 632,711 A | * | 9/1899 | Ganswindt | 280/288 |
| 638,865 A | * | 12/1899 | Crosby et al. | 280/288 |
| 723,486 A | * | 3/1903 | Pierce | 280/284 |
| 1,024,216 A | * | 4/1912 | McKellar | 280/288 |
| 1,435,611 A | * | 11/1922 | Lewis | 474/116 |
| 5,238,259 A | * | 8/1993 | Wilson et al. | 280/276 |
| 5,292,143 A | * | 3/1994 | Stauch et al. | 280/279 |
| 5,529,328 A | * | 6/1996 | Chang et al. | 280/276 |
| 5,611,560 A | * | 3/1997 | Thimmig | 280/642 |
| 5,634,652 A | * | 6/1997 | Tsai | 280/276 |
| 6,739,616 B1 | * | 5/2004 | Lin | 280/642 |
| 2002/0176736 A1 | * | 11/2002 | Tsou | 403/103 |

* cited by examiner

*Primary Examiner*—Christopher P. Ellis
*Assistant Examiner*—John Walters
(74) *Attorney, Agent, or Firm*—Alan D. Kamrath; Nikolai & Mersereau, P.A.

(57) ABSTRACT

An adjustable front fork blade for a stroller includes a sleeve, a base movably mounted in the sleeve, and a connecting tube mounted between the sleeve and the base. Thus, the front fork blade has an adjustable length so that when two front fork blades are mounted on a front wheel, the length of each of the two front fork blades can be adjusted to match each other so as to calibrate and center the position of the front wheel, thereby preventing the front wheel from being oscillated or vibrated due to deflection.

15 Claims, 7 Drawing Sheets

ADJUSTABLE FRONT FORK BLADE FOR STROLLER

BACKGROUND OF THE INVENTION

1. Field of the Invention

The present invention relates to an adjustable front fork blade, and more particularly to an adjustable front fork blade for a stroller.

2. Description of the Related Art

A conventional stroller in accordance with the prior art shown in FIGS. 6–10 comprises a front wheel 10, two connecting rods 12, and two front fork blades 1 each having a first end mounted on the front wheel 10 and a second end secured to a respective one of the two connecting rods 12 by a screws 11. However, each of the front fork blades 1 has a fixed length so that the front fork blades 1 are only suitable for a front wheel having a determined size, thereby enhancing the versatility of the front fork blades 1. In addition, the connecting rods 12 are processed by a bending work and are connected by soldering, so that the sizes the two connecting rods 12 cannot match each other. Thus, the two front fork blades 1 connected to the two connecting rods 12 are not aligned with each other, so that the front wheel 10 is not centered exactly and is deflected through an angle as shown in FIG. 9, thereby producing oscillation or vibration due to deflection.

SUMMARY OF THE INVENTION

The primary objective of the present invention is to provide an adjustable front fork blade having an adjustable length so that when two front fork blades are mounted on a front wheel, the length of each of the two front fork blades can be adjusted to match each other so as to calibrate and center the position of the front wheel, thereby preventing the front wheel from being oscillated or vibrated due to deflection.

Another objective of the present invention is to provide an adjustable front fork blade having an adjustable length so that the front fork blade is available for front wheels of different sizes, thereby enhancing the versatility of the front fork blade.

A further objective of the present invention is to provide an adjustable front fork blade, wherein the length of the front fork blade is adjusted by rotation of the adjustment threaded rod, so that the length of the front fork blade is adjusted easily and rapidly, thereby facilitating a user adjusting the length of the front fork blade.

A further objective of the present invention is to provide an adjustable front fork blade, wherein the length of the front fork blade is adjusted by rotation of the adjustment threaded rod, so that the length of the front fork blade is adjusted exactly so as to center the position of the front wheel exactly and precisely.

Further benefits and advantages of the present invention will become apparent after a careful reading of the detailed description with appropriate reference to the accompanying drawings.

DETAILED DESCRIPTION OF THE INVENTION

Figure 1:
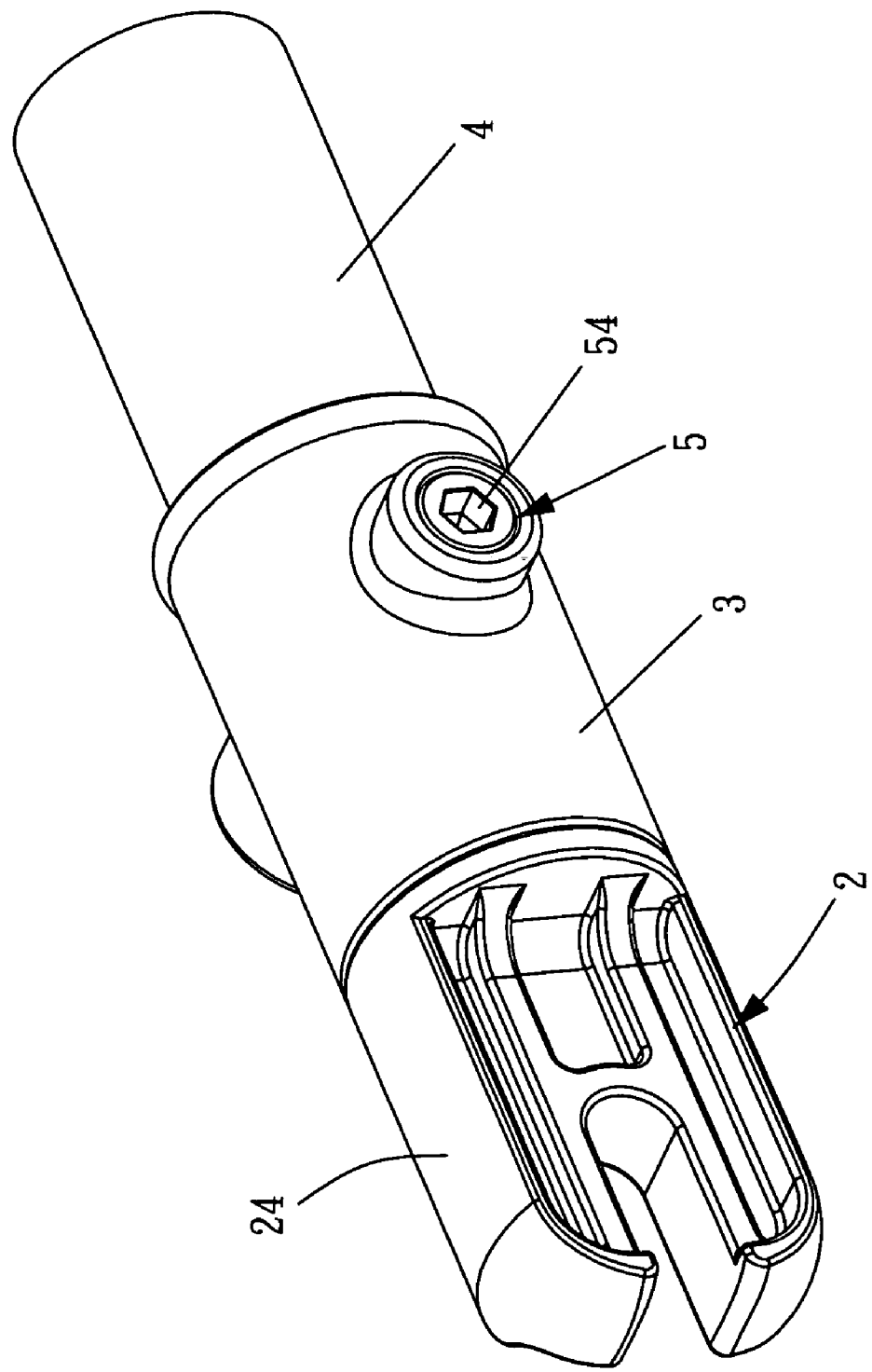
FIG. 1 is a perspective view of an adjustable front fork blade in accordance with the preferred embodiment of the present invention.
Figure 2:
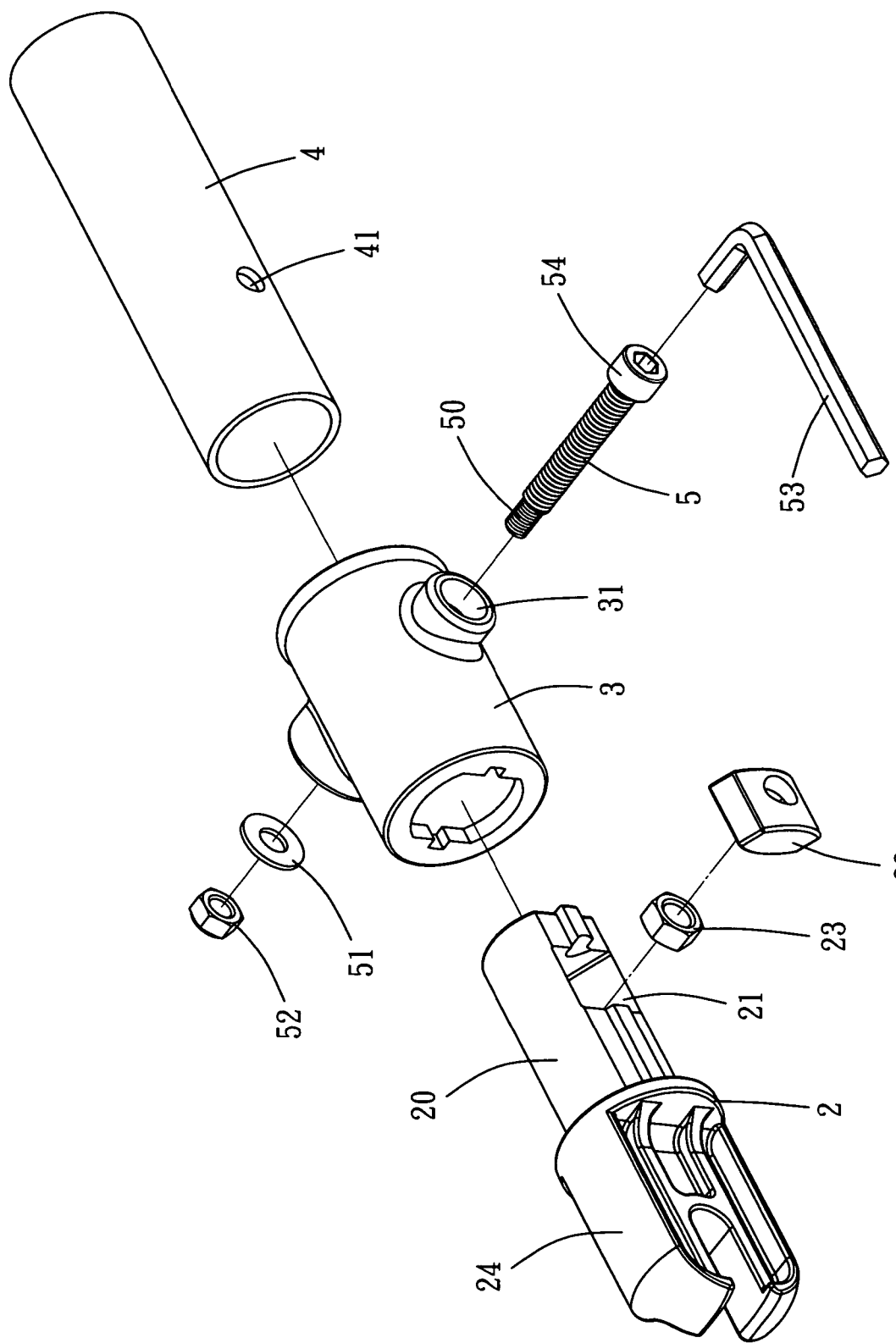
FIG. 2 is an exploded perspective view of the adjustable front fork blade as shown in FIG. 1.
Figure 3:
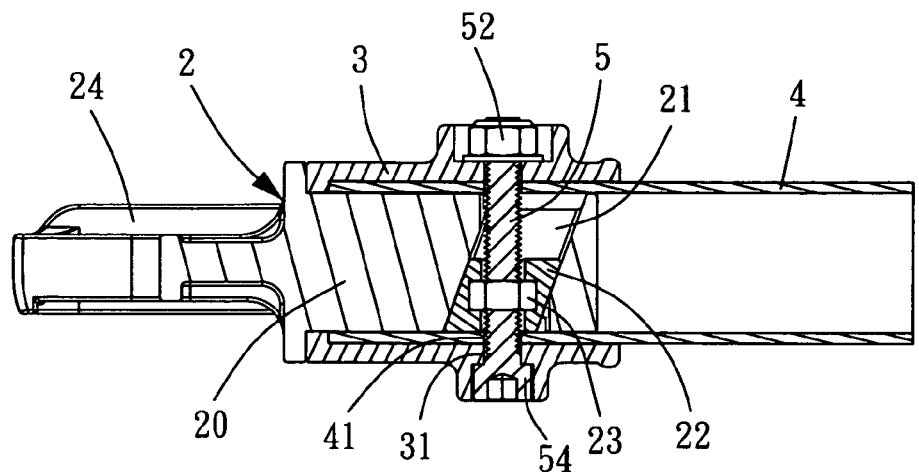
FIG. 3 is a plan cross-sectional view of the adjustable front fork blade as shown in FIG. 1.

Referring to the drawings and initially to FIGS. 1–3, an adjustable front fork blade for a stroller in accordance with the preferred embodiment of the present invention comprises a sleeve 3, a base 2 movably mounted in the sleeve 3, and a connecting tube 4 mounted between the sleeve 3 and the base 2.

The sleeve 3 has a peripheral wall formed with a fixing hole 31, and the connecting tube 4 has a peripheral wall formed with a fixing bore 41. The base 2 has a first end 20 movably mounted in the sleeve 3 and formed with a tapered slideway 21 and a forked second end 24 connected to a front wheel (not shown).

The adjustable front fork blade further comprises a tapered slide 22 slidably mounted in the tapered slideway 21 of the base 2, an adjusting nut 23 secured in the tapered slide 22 for moving the tapered slide 22 in the tapered slideway 21 of the base 2, and an adjustment threaded rod 5 rotatably mounted in the sleeve 3 and screwed into the adjusting nut 23 to drive the tapered slide 22 to move in the tapered slideway 21 of the base 2 by rotation of the adjustment threaded rod 5.

The adjustment threaded rod 5 is extended through the fixing hole 31 of the sleeve 3, the fixing bore 41 of the connecting tube 4, the tapered slideway 21 of the base 2, the tapered slide 22 and the adjusting nut 23. The adjustment threaded rod 5 traverses a longitudinal direction of the base 2 and the sleeve 3. The adjustment threaded rod 5 has a first end formed with a rotation head 54 rotatably mounted in the fixing hole 31 of the sleeve 3 for mounting a wrench 53 to rotate the adjustment threaded rod 5 by rotation of the wrench 53. The adjustment threaded rod 5 has a second end formed with a reduced threaded portion 50 retained in the fixing hole 31 of the sleeve 3 by a washer 51 and a locking nut 52.

Figure 4:
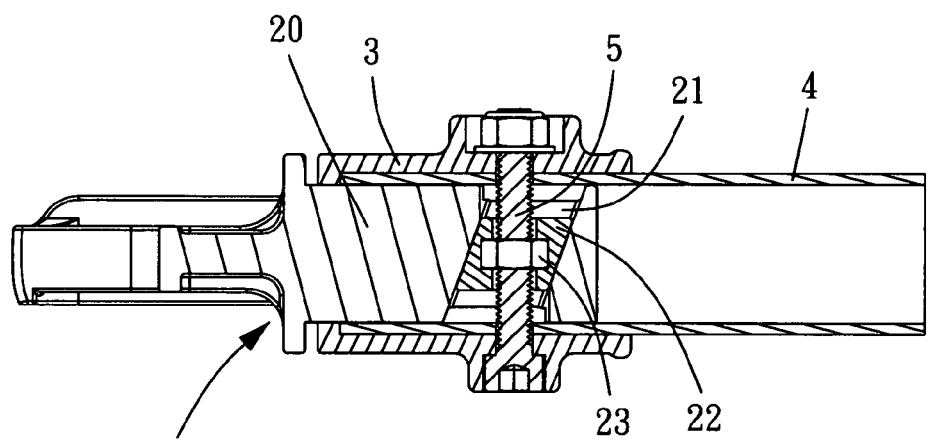
FIG. 4 is a schematic operational view of the adjustable front fork blade as shown in FIG. 3.
Figure 5:
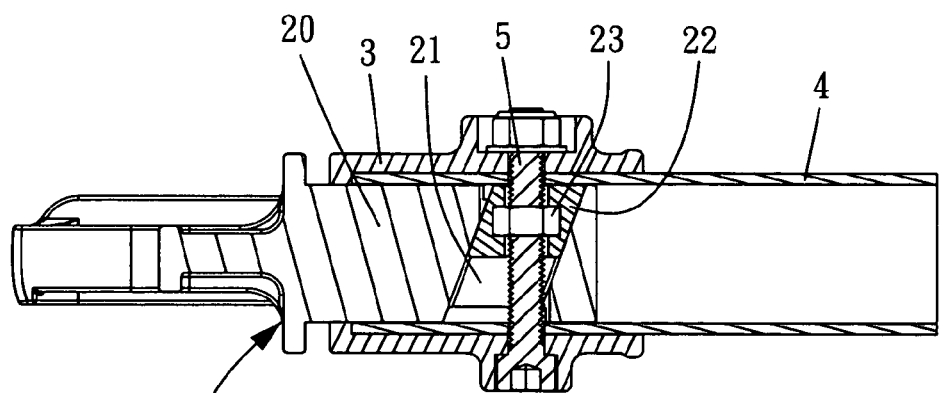
FIG. 5 is a schematic operational view of the adjustable front fork blade as shown in FIG. 4.
Figure 6:
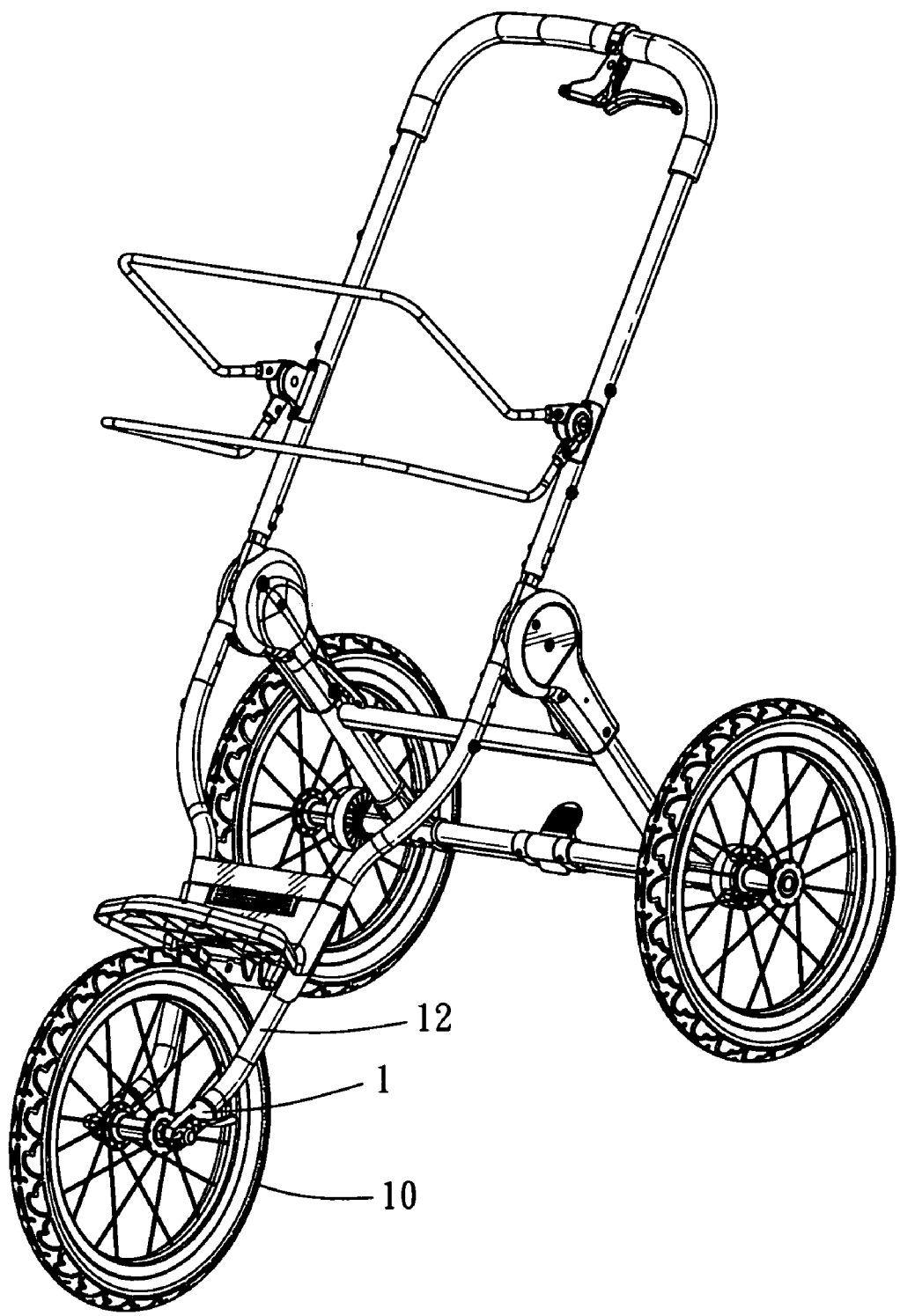
FIG. 6 is a perspective view of a conventional stroller in accordance with the prior art.
Figures 7, 8:
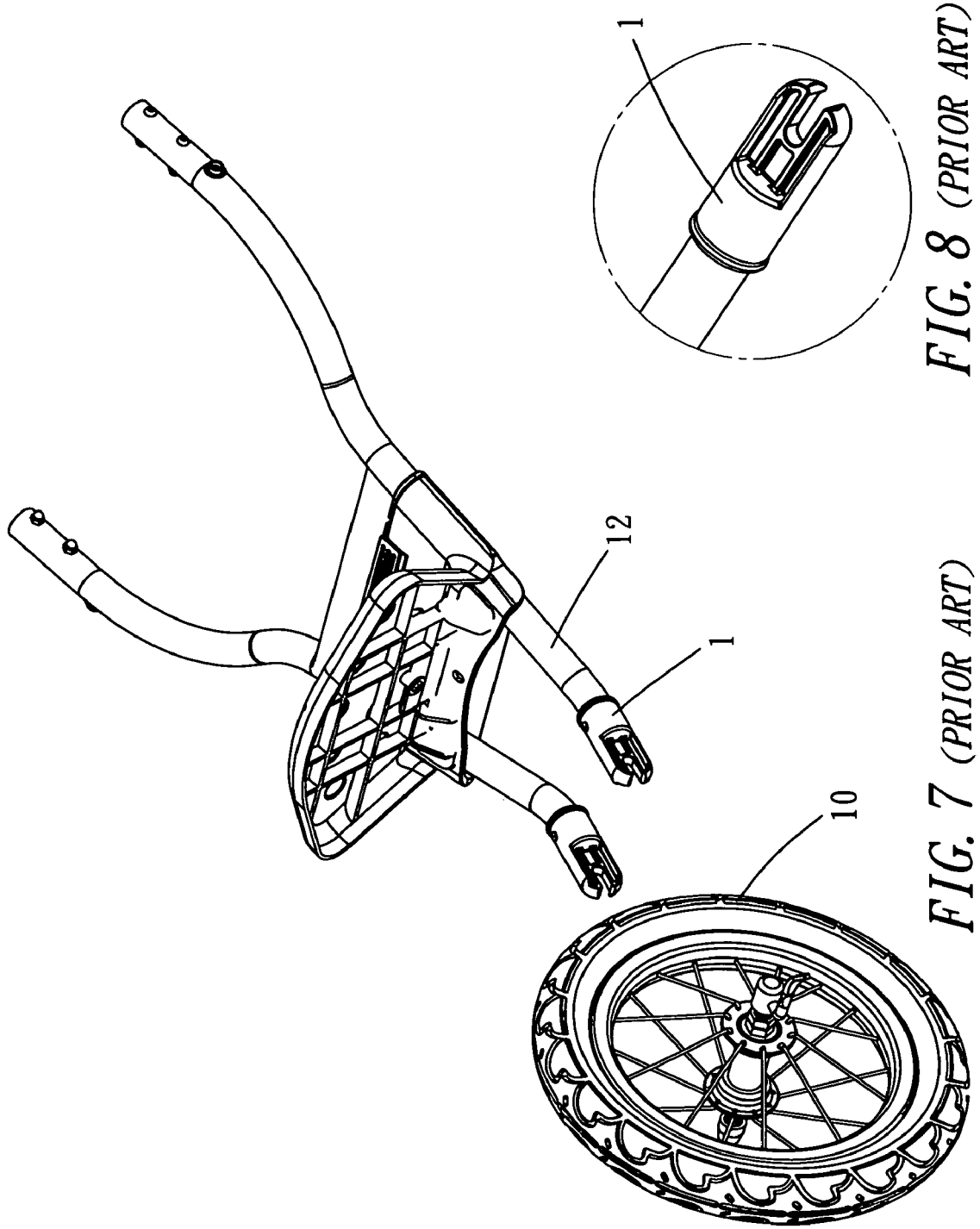
FIG. 7 is an exploded perspective view of the conventional stroller as shown in FIG. 6.
FIG. 8 is an exploded perspective view of a front fork blade of the conventional stroller as shown in FIG. 7.
Figure 9:
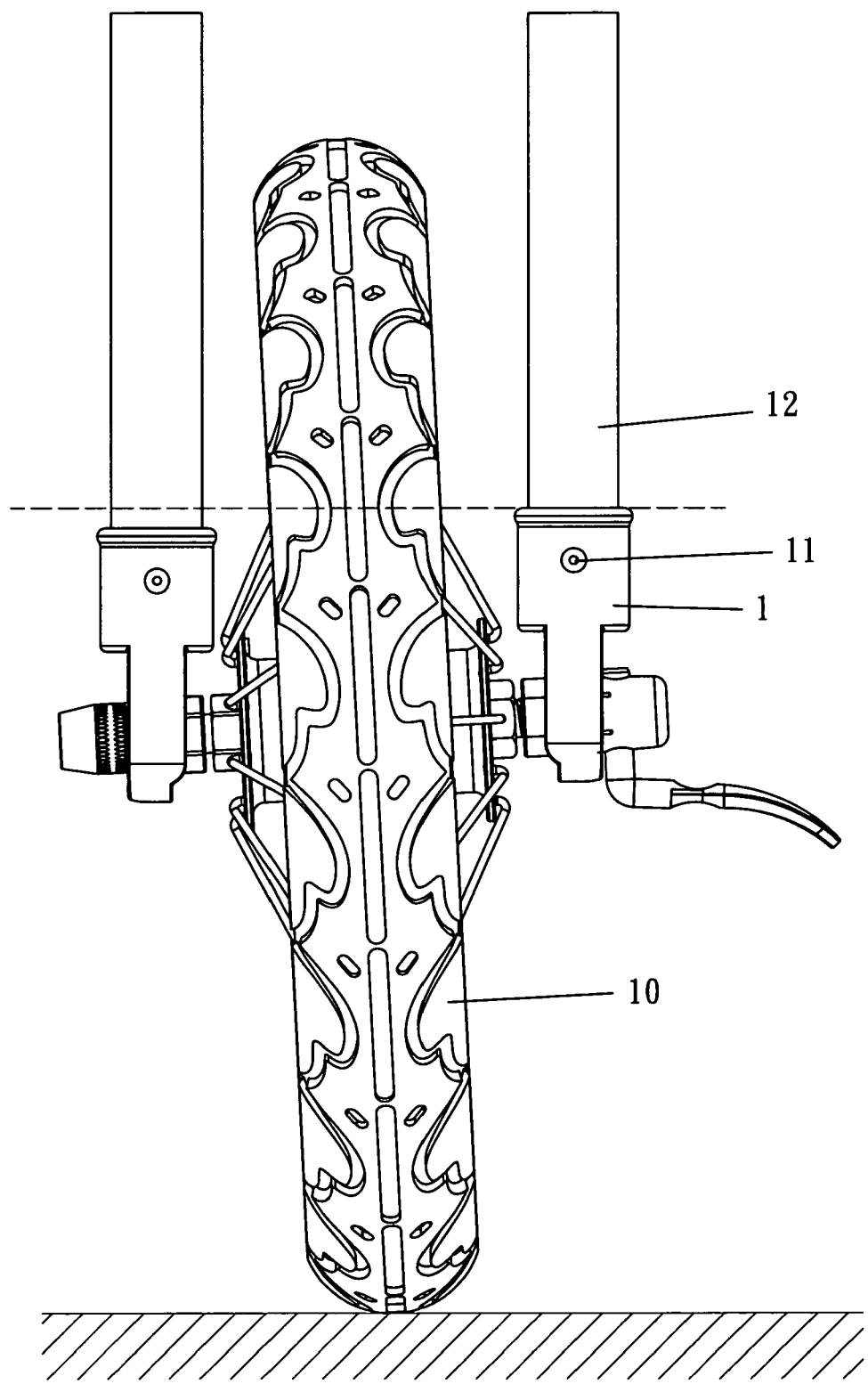
FIG. 9 is a plan view of the conventional stroller as shown in FIG. 6.
Figure 10:
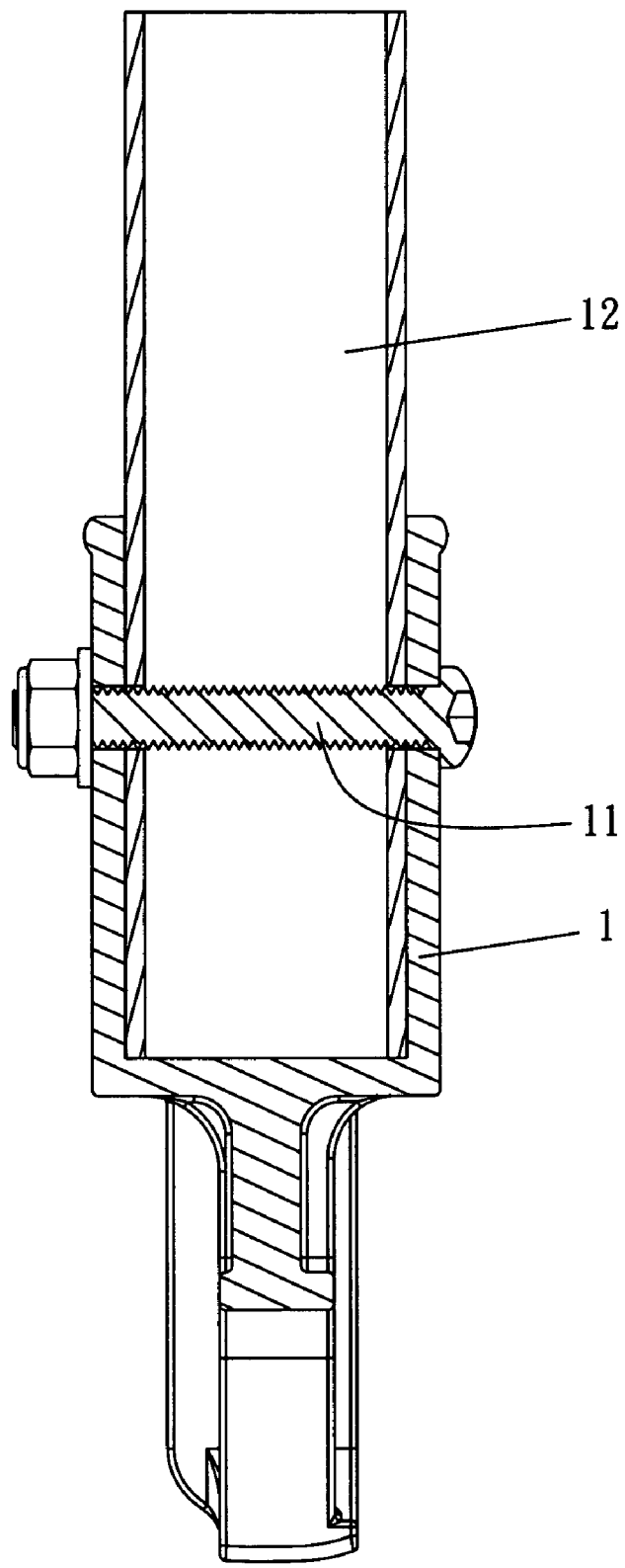
FIG. 10 is a plan cross-sectional view of the conventional stroller as shown in FIG. 9.

In operation, referring to FIGS. 3–5 with reference to FIGS. 1 and 2, when the rotation head 54 of the adjustment threaded rod 5 is rotated by the wrench 53, the adjustment threaded rod 5 is rotated in the sleeve 3 to move the adjusting nut 23 which drives the tapered slide 22 to move in the tapered slideway 21 of the base 2. At this time, the tapered slide 22 is movable on the adjusting nut 23 to push the tapered slideway 21 of the base 2 by the tapered engagement between the tapered slide 22 and the tapered slideway 21 of the base 2 to move the base 2 so that the base 2 is movable in the sleeve 3 as shown in FIGS. 3–5. Thus, the first end 20 the base 2 is moved to retract into the sleeve 3 as shown in FIG. 3 or protrude outward from the sleeve 3 as shown in FIG. 5 to adjust the distance between the base 2 and the sleeve 3 so as to adjust the length of the adjustable front fork blade.

Accordingly, the front fork blade has an adjustable length so that when two front fork blades are mounted on a front wheel, the length of each of the two front fork blades can be adjusted to match each other so as to calibrate and center the position of the front wheel, thereby preventing the front wheel from being oscillated or vibrated due to deflection. In addition, the front fork blade has an adjustable length so that the front fork blade is available for front wheels of different sizes, thereby enhancing the versatility of the front fork blade. Further, the length of the front fork blade is adjusted by rotation of the adjustment threaded rod 5, so that the length of the front fork blade is adjusted easily and rapidly, thereby facilitating a user adjusting the length of the front fork blade. Further, the length of the front fork blade is adjusted by rotation of the adjustment threaded rod 5, so that the length of the front fork blade is adjusted exactly so as to center the position of the front wheel exactly and precisely.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. An adjustable front fork blade, comprising:
   a sleeve;
   a base movably mounted in the sleeve;
   wherein the base has a first end movably mounted in the sleeve and formed with a tapered slideway, and the adjustable front fork blade further comprises a tapered slide slidably mounted in the tapered slideway of the base, an adjusting nut secured in the tapered slide for moving the tapered slide in the tapered slideway of the base, and an adjustment threaded rod rotatably mounted in the sleeve and screwed into the adjusting nut to drive the tapered slide to move in the tapered slideway of the base by rotation of the adjustment threaded rod.

2. The adjustable front fork blade in accordance with claim 1, wherein the adjustment threaded rod traverses a longitudinal direction of the base.

3. The adjustable front fork blade in accordance with claim 1, wherein the adjustment threaded rod traverses a longitudinal direction of the sleeve.

4. The adjustable front fork blade in accordance with claim 1, wherein the base has a forked second end.

5. The adjustable front fork blade in accordance with claim 1, wherein the sleeve has a peripheral wall formed with a fixing hole, and the adjustment threaded rod is extended through the fixing hole of the sleeve.

6. The adjustable front fork blade in accordance with claim 5, wherein the adjustment threaded rod has a first end formed with a rotation head rotatably mounted in the fixing hole of the sleeve for mounting a wrench to rotate the adjustment threaded rod by rotation of the wrench.

7. The adjustable front fork blade in accordance with claim 6, wherein the adjustment threaded rod has a second end formed with a reduced threaded portion retained in the fixing hole of the sleeve by a washer and a locking nut.

8. The adjustable front fork blade in accordance with claim 1, wherein the adjustment threaded rod is extended through the tapered slideway of the base.

9. The adjustable front fork blade in accordance with claim 1, wherein the adjustment threaded rod is extended through the tapered slide.

10. The adjustable front fork blade in accordance with claim 1, wherein the adjustment threaded rod is extended through the adjusting nut.

11. The adjustable front fork blade in accordance with claim 1, further comprising a connecting tube mounted between the sleeve and the base.

12. The adjustable front fork blade in accordance with claim 11, wherein the connecting tube has a peripheral wall formed with a fixing bore, and the adjustment threaded rod is extended through the fixing bore of the connecting tube.

13. The adjustable front fork blade in accordance with claim 1, wherein the adjustment threaded rod is rotated in the sleeve to move the adjusting nut which drives the tapered slide to move in the tapered slideway of the base.

14. The adjustable front fork blade in accordance with claim 13, wherein the tapered slide is movable on the adjusting nut to push the tapered slideway of the base by the tapered engagement between the tapered slide and the tapered slideway of the base to move the base so that the base is movable in the sleeve.

15. The adjustable front fork blade in accordance with claim 14, wherein the first end the base is moved to retract into the sleeve or protrude outward from the sleeve to adjust a distance between the base and the sleeve so as to adjust a length of the adjustable front fork blade.

* * * * *